May 30, 1972    W. H. MEYER ET AL    3,666,605
LAMINATED PANEL WITH AN INTEGRAL WINDOW, AND
METHOD OF FABRICATION THEREOF

Filed July 23, 1970    2 Sheets-Sheet 1

INVENTORS
WALTER H. MEYER
WILLIAM M. MENGER
BY Edward H. Loverman
ATTORNEY

1 — APPLY THERMOSETTING PLASTIC OR THERMOPLASTIC ONTO THE WAX SURFACE OF A FLAT PLATE OR MOLD.

2 — PLACE REINFORCING SHEET ON THE PLASTIC SURFACE.

3 — APPLY A THERMOSETTING PLASTIC ADHESIVE TO REINFORCING SHEET TO FORM LAYER 22.

4 — DEPOSIT BLOCKS 12 ON LAYER 22.

5 — INSERT WINDOW PANES 18 IN EACH OF THE BLOCK HOLES 14 WITH UPPER SIDE 17 ABUTTING PLASTIC ADHESIVE.

6 — APPLY THERMOSETTING PLASTIC ADHESIVE TO SURFACE 19 OF BLOCKS 12.

7 — PLACE REINFORCING SHEET ONTO ADHESIVE TO FORM LAYER 24 AND REMOVE PROTECTIVE SHEET COVERING LOWER SURFACE 29 OF WINDOW PANES 18.

FIG. 5

INVENTORS
WALTER H. MEYER
WILLIAM M. MENGER
BY Edward H. Loverman
ATTORNEY

United States Patent Office 3,666,605
Patented May 30, 1972

3,666,605
LAMINATED PANEL WITH AN INTEGRAL WINDOW, AND METHOD OF FABRICATION THEREOF
Walter H. Meyer, Huntington Station, and William M. Menger, Babylon, N.Y., assignors to Lunn Laminates, Inc., Wyandanch, N.Y.
Filed July 23, 1970, Ser. No. 57,555
Int. Cl. E04c 1/42, 2/54
U.S. Cl. 161—3.5  5 Claims

ABSTRACT OF THE DISCLOSURE

A laminated panel has a translucent, protective plastic layer onto which is bonded one or more blocks to form a core. At least one of the blocks has a hole therethrough into which is set a transparent pane which thereby bonds to the layer. Another plastic layer is bonded to the other side of the core. Before bonding, the layers may be in the form of a translucent thermoplastic sheet or in a translucent thermosetting plastic liquid such as a resin coating and in either form may be reinforced with a fibrous sheet in a woven or unwoven form. The layers are bonded to the block by a suitable transparent self-setting resin adhesive. The blocks in the core which may be of plastic foam, aluminum, plywood, etc. are abutted edgewise and covered by the seamless layer which if desired may have a pigment for concealing the blocks.

---

The present invention is concerned with a laminated panel and more specifically with a laminated panel having a covered, concealed, window, useful in the roof of a vehicle and other structures, and a method of making such a panel.

Laminated panels having an opaque core of plywood, plastic foam, aluminum, or other material have been known heretofore. Such panels generally have decorative and protective fiber reinforced resin layers on one or both sides and have many desirable properties. For example, they may be rigid or flexible, afford thermal and acoustic insulation, and be relatively light in weight. Furthermore, the panels may be manufactured economically in extended lengths by mass production automatic machinery, are generally durable, dimensionally stable and resistant to weathering and may readily be cut and worked into various shapes. When such a panel is used as the roof of a vehicle such as a 40 foot long truck trailer, or a cabin of a boat, a wall or roof of a porch, and the like, the problem arises of providing a window to admit daylight through the opaque panel. Heretofore holes had to be cut laboriously, by hand, one at a time, after the structure was fabricated and then window panes were fitted in the holes. This procedure is objectionable for many reasons such as high labor cost, time consuming and wasteful of laminated material cut away. Moreover, the exposed windows after being framed and caulked, often leaked and thus could not be hermetically sealed to prevent admission of air, moisture or dust.

The present invention is directed at overcoming these difficulties, by providing an improved laminated panel with a window and a method of making this type of panel. The invention involves a laminated panel which has a core of desirable properties as above mentioned and with both sides of the core covered with a protective thermoplastic or thermosetting plastic layer. A hole in the panel extends only through the core and one layer. A transparent window pane is set in this hole such that the window is wholly concealed at one side of the panel. Light can pass through this imperforate side layer of the panel and through the window pane abutted to this layer. The outer or imperforate side of the laminated panel presents an intact appearance which is hermetically sealed, strong, resistant to rupture, moisture proof, vermin-proof and of one-piece construction. It may be made in any desired length and width by mass production machinery and it has other desirable properties inherent in such a laminated panel with a wide range of applications and great versatility.

Accordingly, it is a primary object of the present invention to provide a laminated panel having an integral window formed therein.

A further object of the present invention is to provide a laminated panel having an integral window formed therein which is hermetically sealed and concealed on one side.

Another object of the present invention is to provide a method for manufacturing a laminated panel of the type hereinabove described.

These and other objects and many of the attendant advantages of this invention will be readily appreciated as the same becomes better understood by reference to the following detailed description when considered in connection with the accompanying drawings in which:

FIG. 5 is a flow chart of the steps of the fabrication or process in accordance with the invention.

Figure 1:
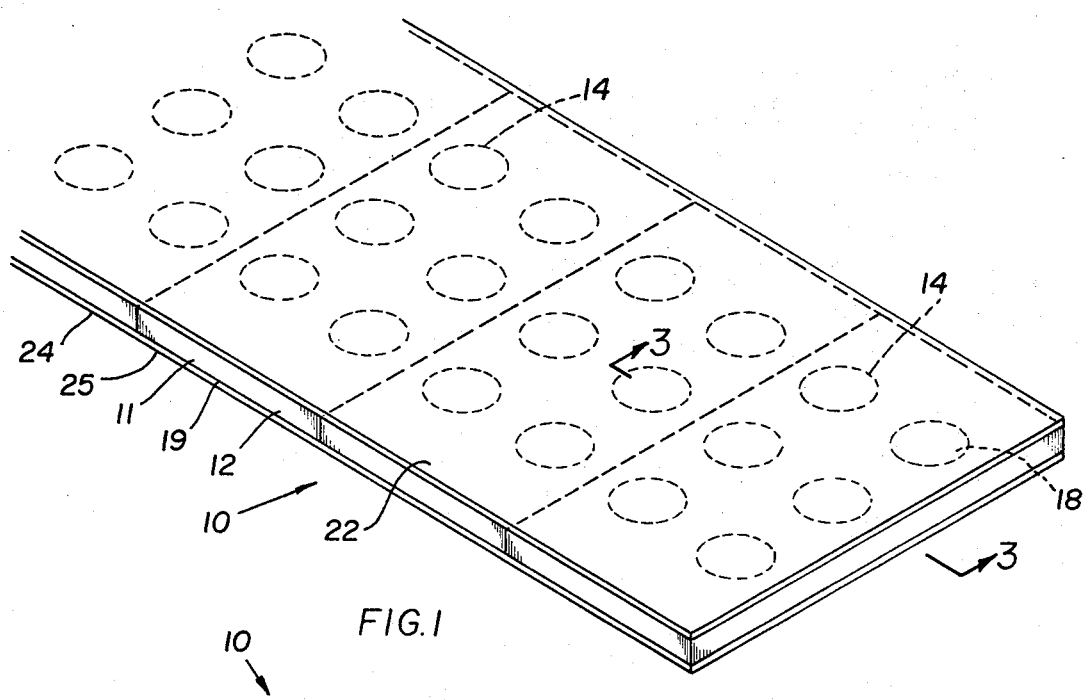
FIG. 1 is an oblique top view of part of a laminated panel embodying the invention.
Figure 2:
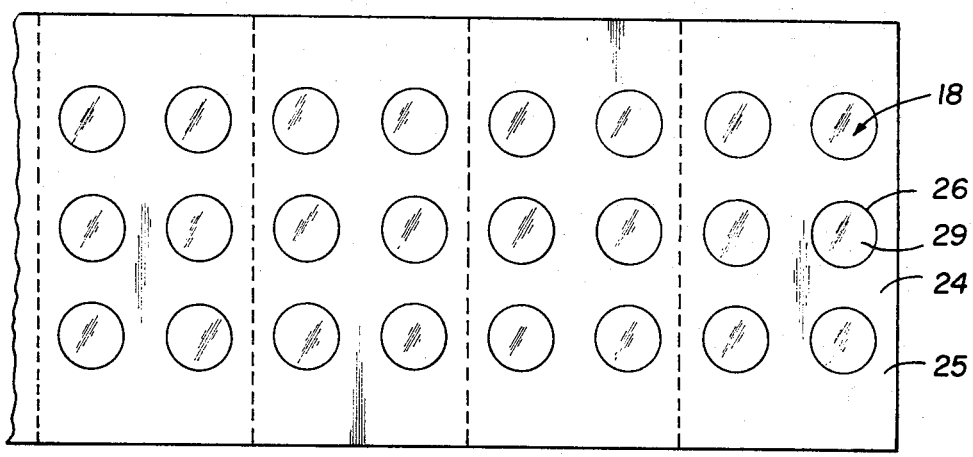
FIG. 2 is a bottom plan view of part of the laminated panel.
Figure 3:
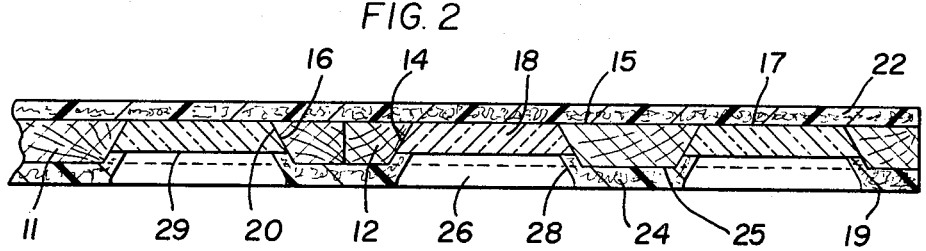
FIG. 3 is an enlarged cross sectional view taken along line 3—3 of FIG. 1.
Figure 4:
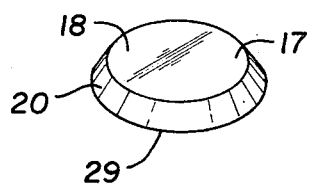
FIG. 4 is a perspective view of a single window pane used in the panel.

Referring now to the drawings wherein like reference characters designate like or corresponding parts throughout, there is illustrated in FIGS. 1-3, a laminated panel structure generally designated by reference numeral 10 having an inner core 11 formed of a plurality of rectangular sheets, plates, or blocks 12 abutted edge to edge to form a structure of any desired length. Of course, if a relatively small panel is desired, the core may consist of a single sheet, plate or block 12. In any case, this core has an upper side 15 and a lower side 25 and may have one or more spaced holes 14, which may be round as shown or square, rectangular, hexagonal, elliptical, or of other suitable shape. The holes 14 may have beveled edges 16, and are adapted to be filled by a window pane 18 which has a round or other shape corresponding to the shape of the hole 14. If the hole 14 is beveled then the peripheral edge 20 of the pane 18 is beveled to fit snugly in abutment with the beveled edge 16 of the hole 14. The window pane 18 which has an upper side 17 and a lower side 29 may be made of a transparent material such as lucite, an acrylic plastic, shatterproof or tempered glass etc. or it may be made of a translucent material if desired but it is preferably that the pane be transparent to maximize light transmission therethrough.

Overlaying both an upper side 15 of blocks 12 and a narrower upper side 17 of the window panes 18 is a plastic translucent layer 22. This layer may be made of a tough resilient thermoplastic such as an acrylic sheet or a thermosetting plastic such as polyester resin. Layer 22 may be reinforced randomly with fibers or with nonwoven cloth. The fibers may be fiberglass, nylon or the like but in any case, they should be transparent or translucent. The layer 22 is permanently bonded to the apertured core 11 and to the window panes 18 by a suitable adhesive and physically closes, covers and conceals the window. This layer is relatively thin so that light will pass through the laminated structure of the translucent, plastic layer and the transparent window pane. Underlaying side 19 of the core 11 is an apertured layer 24 also made of thermoplastic or thermosetting plastic material reinforced by woven cloth which may be fiberglass, nylon, or other suitable material and have any desired color. For example, the layer 24 may be white to have optimum light reflecting characteristics, or if the core is to be completely concealed, the layer 24 would be entirely opaque. Furthermore the layer 24 may be textured in any desired way, like cloth for example. In any case the layer 24 has openings 26 registering with the openings or holes 14 in the core. The material of layer 24 may extend inwardly of holes 14 to form linings 19 on the rims of the holes. The linings extend from the lower side 25 of the core inwardly to the window panes 18. The material of layer 24 at the linings 28 may further extend slightly radially inward of the periphery of the wider, lower side 29 of each window pane, so that the core 11 is completely and effectively covered and concealed. The linings 28 serve to cooperate with the bond between the upper sides 17 of the panes and the upper plastic layer 22 to hermetically seal the panes 18.

The panel 10 is a unitary structure comprising three strata, i.e., upper layer 22, core 11 and bottom layer 24, with a multiplicity of translucent two-layer sections comprising layer 22 and window panes 18. The panel may be cut, sawed, machined, drilled and worked in various ways. It has sufficient flexibility to form curved rooftops of vehicles such as truck trailers, boats and may be used as a wall panel, decorative screen room divider or serve any purpose where a strong, decorative panel having an opaque flat core or frame and a multiplicity of translucent closed concealed windows is required.

Referring now to FIG. 5 there is illustrated a flow chart with the steps for manufacturing a laminated panel with an integral window in accordance with the invention. Onto a flat mold, or plate (not shown), which may be manufactured of glass, steel, plastic or the like and have an extremely smooth, upper surface is placed a parting or release agent or compound such as a wax. A resin gel in unplasticized form may then be applied onto the wax surface of the mold. This resin may be of a catalytic setting type such as orthophthalic polyester resin and may be pigmented white or colored but in any case this resin must be one of a type which forms a film and which sets to a solid state with a hard, exterior surface and is translucent or transparent when set. The resin when it is spread on the surface of the mold is in a tacky state, the formation of which is indicated as step 1 in the flow chart of FIG. 5. If desired, instead of using a thermosetting plastic such as the unplasticized resin gel, a thermoplastic such as an acrylic sheet may be used.

At step 2 a reinforcing sheet of fabric material such as a roving of fiberglass is pressed onto the resin gel layer or onto the acrylic sheet.

At step 3 a suitable transparent thermosetting liquid resin may be applied to the fabric material as an adhesive to integrate the fabric to the plastic layer and thereby form the composite layer 22 which constitutes the upper or outer layer of the panel 10 and in addition will serve as an adhesive in the following steps 4 and 5.

At step 4 a core member 12 which may be a block, plate or sheet is deposited on the adhesive surface of the layer 22. A plurality of the core members 12 are deposited one at a time in edge-to-edge abutment and may be comprised of sheets or blocks of plywood having a multiplicity of plys, e.g., 3, 5, 7 or more or of plastic foam, aluminum, etc. The blocks 22 are perforated with one or more of the holes 14 and if desired have the beveled edges 16.

At step 5 the window panes 18 which may be made of plastic, cellophane, or glass, etc., are inserted one in each of the holes 14 of the core members 12 such that the upper side 29 of each pane 18 is located below the surface 19 of the core member in which it is set. The upper side 17 of each of the window panes 18 will adhere to the surface of the layer 22, and the lower side 29 is covered by individual removable protective cover sheets (not shown) of paper, polyethylene or the like. The surface of layer 22 is now permittet to set, harden, and bond together the panes 18, the core members 12 and the layer 22, thereby forming a unitary laminated structure.

At step 6 another layer of adhesive which may be of the thermosetting plastic type similar to the type used for step 3 is applied to the surface 25 of the blocks 12 and the rims of holes 14. If desired this adhesive may be a polyester resin and may be pigmented. This completes step 6.

At step 7 a sheet of woven cloth which may be fiberglass, rayon, nylon, or other fabric material for reinforcement is placed over the adhesive layer such that the sheet becomes impregnated therewith and forms the layer 24. It is preferred that holes be precut in the fabric material which holes will register with corresponding holes in the core. However, it is, of course, possible to apply an imperforate sheet of fabric material and cut the holes in the fabric material after it has been placed on the core 12. In any case the fabric material will be impregnated by the adhesive layer to form the composite layer 24 which bonds to the top side 25 of the blocks 12. If desired, the sheet of woven cloth may be placed directly against the blocks 12 at step 6 and the adhesive plastic layer may be placed over the fabric at step 7. Moreover, the layer 24 may include a thermoplastic sheet placed over the fabric material provided of course, the sheet has holes therethrough which register with the holes in the core. It is preferable also that the thermosetting adhesive be applied to the rims of the holes 14 to hermetically seal the panel. The protective sheet covering the window panes 18 may now be removed manually or mechanically. The panel is now allowed to cure which completes step 7 and the panel formation.

The panel 10 may have a core formed by any number of abutted core member, i.e., the plywood sheets or blocks may be four feet wide and eight feet long and the sheet may be abutted on their long edge to form a panel eight feet wide and as long as desired depending on the number of plywood sheets in the core. In any event the layers 22 and 24 will be seamless, and reinforced throughout, and the window panes 18 will form integral parts of the panel structure and will strengthen the layer 22 at the openings 14 in the core member 12 and at the same time the window panes 18 will be protected by the overlaying bonded layer 22.

When the panel 10 is used as a roof of a vehicle the layer 22 may be pigmented white and will be uppermost as shown in FIGS. 1 and 3 to permit light through the windows 18 which are concealed in so far as the exterior of the vehicle is concerned. The fiber reinforced plastic layer 24 which may have e.g., a white pigment thereon, will be located inside the vehicle at the underside of the roof. In this manner the core 11 will be completely covered and concealed. If desired the layer 24 may have an irregular pattern or texture to improve its appearance. The panel does not require painting or other protecting treatment, is moisture proof on both sides, and may easily be washed clean.

It should be understood that the foregoing relates to only a preferred embodiment of the invention, and that it is intended to cover all changes and modifications of the example of the invention herein chosen for the purposes of the disclosure, which do not constitute departures from the spirit and scope of the invention.

The invention claimed is:

1. A laminated panel, comprising
   a translucent layer of plastic;
   at least one block bonded at one side thereof to said layer so that said layer completely covers said one side of said block;
   said block having at least one hole extending therethrough to expose a portion of said layer; and a transparent pane set in said hole and bonded to said portion of said layer to define a window with said portion of said layer whereby light may pass through said portion of said layer and said pane.

2. A laminated panel as defined in claim 1 wherein said layer is reinforced with a fabric material.

3. A laminated panel as defined in claim 1, further comprising another layer of plastic bonded to the other side of said block and completely covering the same, said other layer having an opening to expose said pane so that light may pass therethrough.

4. A laminated panel as defined in claim 3 wherein said other layer is reinforced with a fabric material.

5. A laminated panel as defined in claim 3 wherein said layer and said other layer have a pigment to cover and conceal the respective sides of said block.

References Cited

UNITED STATES PATENTS

| | | | |
|---|---|---|---|
| 1,765,981 | 6/1930 | Kathe | 161—1 X |
| 2,674,558 | 4/1954 | Neugass | 161—1 X |
| 3,432,380 | 3/1969 | Weber | 161—409 X |
| 3,525,658 | 8/1970 | Setz | 161—1 |
| 3,595,726 | 7/1971 | Middleton | 161—3.5 |

HAROLD ANSHER, Primary Examiner

U.S. Cl. X.R.

161—5, 45, 111, 113, 408